Jan. 1, 1957
A. D. ISBELL
2,776,096
FISHING REEL
Filed May 31, 1955
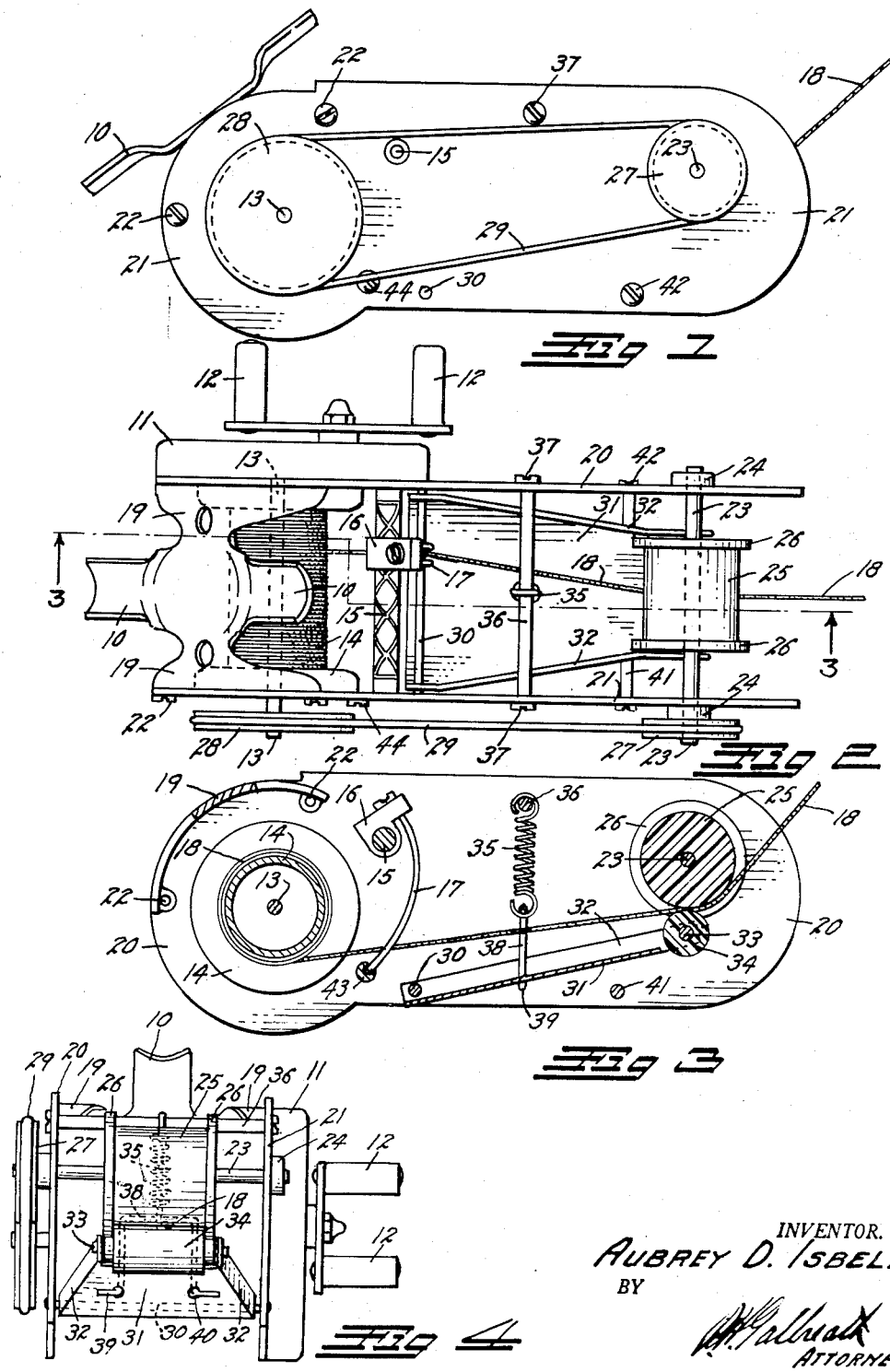
INVENTOR.
AUBREY D. ISBELL
BY
ATTORNEY

United States Patent Office 2,776,096
Patented Jan. 1, 1957

2,776,096

FISHING REEL

Aubrey D. Isbell, Loveland, Colo.

Application May 31, 1955, Serial No. 512,148

1 Claim. (Cl. 242—84.1)

This invention relates to a fishing reel. One of the difficulties encountered in fishing reels results from "backlash," that is, when a cast is made or the line is rapidly withdrawn from the reel and suddenly stopped, excess line will accumulate immediately ahead of the reel, which results in entanglement when the line is retrieved. Backlash can also be caused by unreeling the line more rapidly than it is drawn from the rod, causing an accumulation of line at the reel spool.

The principal object of this invention is to provide a fishing reel, or more particularly an attachment for a conventional fishing reel, which will retain the line taut ahead of the reel spool at all times to prevent backlash and line entanglement.

The improved backlash eliminating device can be formed as a part of a complete reel or as an attachment for present reels. As illustrated, it is combined with a conventional reel.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

In the drawing:

Fig. 1 is a side view of the improved reel;

Fig. 2 is a plan view thereof;

Fig. 3 is a longitudinal section therethrough, taken on the line 3—3, Fig. 2; and Fig. 4 is a front end view thereof.

In the drawing, conventional parts of a typical fishing reel are designated by numerals as follows: pole seat 10, gear housing 11, winding cranks 12, spool shaft 13, spool 14, level winding shaft 15, level winding nut 16, level winding bail 17, fishing line 18, reel seat frame 19, and level winding bail guide 43. The above-enumerated elements are conventional and form no part of the present invention other than the latter cooperates with these elements to maintain the fishing line 18 taut ahead of the reel spool 14.

The invention is mounted on the reel by means of a first side plate 20 positioned between the gear housing 11 and the spool 14, and a second side plate 21 supported at the outside extremity of the spool 14 through the medium of the reel seat frame 19 and suitable attachment screws 22 and the bail guide 43 and attachment screws 44. The plates 20 and 21 are maintained in parallel spaced relation by means of a spacing rod 41 to which the plates are attached by means of attachment screws 42. The side plates 20 and 21 extend forwardly from the spool 14 and support a roller shaft 23 in suitable anti-friction bearings 24. The roller shaft 23 carries a relatively large, cylindrical line guide roller 25 provided with side flanges 26. The roller is preferably formed from a suitable plastic, such as nylon, and is fixedly mounted on the shaft 23 medially between the side plates 20 and 21.

The roller shaft 23 extends outwardly beyond its bearing 24 in the side plate 21 and the extending portion is provided with a relatively small grooved belt pulley 27 fixedly mounted thereon. The spool shaft 13 is similarly extended outwardly beyond the side plate 21 to fixedly support a similar relatively large belt pulley 28. An endless flexible elastic belt 29 is trained about the two pulleys 27 and 28.

A hinge shaft 30 extends between the side plates 20 and 21 adjacent the lower edges thereof and adjacent the spool 14. A line tray 31, provided with side flanges 32, is tiltably mounted on the hinge shaft 30, the latter extending through the flanges 32 of the tray. The tray 31 extends forwardly from the hinge shaft 30 to a position below the line guide roller 25. The rear extremity of the tray 31 extends the full width between the side plates 20 and 21 and the forward extremity of the tray is reduced in width to substantially equal the width of the line guide roller 25.

The two side flanges 32 of the tray 31 extend forwardly from the tray to support the opposithe extremities of a second roller shaft 33 upon which a second and smaller line roller, which will be herein designated as a press roller 34 is mounted. The length of the press roller 34 is equal to the distance between the flanges 26 so that the press roller 34 will pass between the flanges of and into contact with the roller 25 so as to grip the line 18 between the two rollers.

The press roller 34 is constantly urged upwardly toward the line roller 25 by means of a tension spring 35 which is suspended from a spring rod 36 secured between the side plates 20 and 21 by means of suitable mounting screws 37. The spring 35 connects with an inverted U-shaped bail 38, the lower extremities of which, indicated at 39, are passed through openings 40 in the tray 31 and turned outwardly, as shown in Fig. 4, to resiliently support the tray.

The fishing line 18 is passed from the spool 14 through the level winding bail 17, thence through the bail 38, thence between the rollers 25 and 34, thence to the line guides of the fishing rod. The tension of the spring 35 is only sufficient to impart frictional engagement between the rollers and the line and not sufficient to provide a non-slipping grip on the line.

Due to the difference in diameter between the pulleys 27 and 28, the roller shaft 23 will always tend to rotate at a higher speed than the spool shaft 13. If the line is pulled from the spool, such as in casting or playing, it will cause the spool shaft 13 to rotate the roller 25 at a higher speed than the spool 14 so that a constant tension is frictionally maintained on the lne 18 between the rollers and the spool to maintain the line taut as it unreels from or reels onto the spool so as to prevent the line from building up and entangling.

If the line is unreeled by means of the cranks 12, the rollers 25 and 34, due to their higher speed will frictionally pull upon the line as it unreels from the spool 14. If the line is retrieved by rotation of the cranks 12, the weight of the line and tackle will prevent the line from being retrieved by the rollers and the latter will simply slip along the line as the latter is reeled on the spool 14.

Since the elastic belt can freely stretch and slip upon the pulleys 27 and 28, the rollers 25 and 34 will not impart damaging tension on the line. Any excess of line which might accidently accumulate between the rollers 25 and 34 and the spool 14 is supported by the tray 31 until the slack is taken up either by the pull on the line or by reverse rotation of the spool 14. Therefore, the line never hangs in a loose, easily entangled, loop from the reel such as it does on occasions with a conventional reel.

The side flanges 26 on the roller 25 overlap the ends of the roller 34 so as to completely close the line passage between the rollers so that the line cannot pass laterally from between the rollers.

While a specific form of the improvement has been described and illustrated herein, it is desired to be understood that the same may be varied, within the scope of the appended claim, without departing from the spirit of the invention.

Having thus described the invention, what is claimed and desired secured by Letters Patent is:

In a fishing reel of the type having a line spool and a line guide roller positioned forwardly of and spaced from said line spool, means for supporting loose line between said spool and said line guide roller comprising: a hinge shaft positioned closely-adjacent and forwardly of and below said spool; a relatively flat tray, having a width at its rear extremity substantially equal to the width of said line spool, hingedly mounted at its rear extremity upon said hinge shaft and extending forwardly therefrom to a position below said line guide roller; a press roller journalled on the forward extremity of said tray parallel to said line guide roller; spring means connected to said tray and acting to lift the latter so as to urge said press roller towards said line guide roller, the forward extremity of the tray being of less width than the rear extremity thereof; and an upturned flange formed along each side of said tray to retain loose line thereon.

References Cited in the file of this patent

UNITED STATES PATENTS

| | | |
|---|---|---|
| 402,688 | Schulz | May 7, 1889 |
| 1,960,491 | Johnson | May 29, 1934 |
| 2,380,671 | Nelson | July 31, 1945 |
| 2,553,589 | Hull et al. | May 22, 1951 |
| 2,625,373 | Hunt | Jan. 13, 1953 |
| 2,646,251 | Robertson | July 21, 1953 |

FOREIGN PATENTS

| | | |
|---|---|---|
| 884,710 | Germany | July 30, 1953 |